US012754087B2

(12) United States Patent
Fujimori et al.

(10) Patent No.: US 12,754,087 B2
(45) Date of Patent: Oct. 6, 2026

(54) MAGNETOSTRICTIVE TORQUE SENSOR

(71) Applicants: Proterial, Ltd., Tokyo (JP); NSK Ltd., Tokyo (JP)

(72) Inventors: Akitoshi Fujimori, Tokyo (JP); Takashi Onimoto, Tokyo (JP); Seigou Urakami, Gunma (JP); Takumi Shinojima, Kanagawa (JP); Kota Fukuda, Gunma (JP)

(73) Assignees: Proterial, Ltd., Tokyo (JP); NSK Ltd., Tokyo (JP)

( * ) Notice: Subject to any disclaimer, the term of this patent is extended or adjusted under 35 U.S.C. 154(b) by 289 days.

(21) Appl. No.: 18/608,325

(22) Filed: Mar. 18, 2024

(65) Prior Publication Data

US 2024/0319029 A1 Sep. 26, 2024

(30) Foreign Application Priority Data

Mar. 24, 2023 (JP) ................................ 2023-047969

(51) Int. Cl.
*G01L 3/10* (2006.01)

(52) U.S. Cl.
CPC .................................... *G01L 3/102* (2013.01)

(58) Field of Classification Search
CPC ........................................................ G01L 3/102
See application file for complete search history.

(56) References Cited

U.S. PATENT DOCUMENTS 5,526,704 A * 6/1996 Hoshina .................. G01L 3/105 73/862.333
8,584,533 B2 * 11/2013 Miyoshi .................. G01L 3/102 73/779

(Continued)

FOREIGN PATENT DOCUMENTS

JP H09105686 A * 4/1997
JP 2000019032 A * 1/2000
JP 2022-074405 A 5/2022

*Primary Examiner* — Octavia Hollington
(74) *Attorney, Agent, or Firm* — Studebaker Brackett PLLC

(57) ABSTRACT

A magnetostrictive torque sensor is configured to be attached around a rotating shaft exhibiting a magnetostrictive effect and detects torque transmitted by the rotating shaft. The magnetostrictive torque sensor includes a holder being composed of a resin and including a cylinder portion with a hollow cavity in a center through which the rotating shaft is inserted, a flexible substrate that includes a detection portion on which a coil group composed of a combination of a plurality of detection coils aligned in a predetermined direction is formed by a wiring pattern, and a signal line portion on which a plurality of signal lines electrically connecting the coil group to an external device are formed by a wiring pattern, and a cylindrical magnetic ring being composed of a soft magnetic material and being arranged around an outer circumference of the cylinder portion of the holder. The flexible substrate is arranged in such a manner that the detection portion is curved and located between the cylinder portion of the holder and the magnetic ring, and a portion of the signal line portion is led out of the holder. The holder includes an annular wall surrounding an outer circumference of one axial end of the magnetic ring. The magnetic ring includes a retention hole that opens on an outer circumferential surface facing an inner circumferential surface of the annular wall. The holder and the magnetic ring are fixed by a shaft-shaped fastener that penetrates the annular wall and is inserted into the retention hole of the magnetic ring.

6 Claims, 14 Drawing Sheets

(56) References Cited

U.S. PATENT DOCUMENTS

| | | | | |
|---|---|---|---|---|
| 8,701,503 | B2 * | 4/2014 | Shimizu | B62D 6/10 73/862.333 |
| 11,774,305 | B2 * | 10/2023 | Nakamura | G01L 3/102 73/862.333 |
| 12,030,230 | B2 * | 7/2024 | Jin | B29C 45/14836 |
| 2022/0134618 | A1 | 5/2022 | Jin et al. | |
| 2024/0324467 | A1 * | 9/2024 | Fujimori | H10N 35/101 |
| 2024/0418586 | A1 * | 12/2024 | Jin | G01L 3/102 |
| 2025/0207988 | A1 * | 6/2025 | Fujimori | G01L 3/102 |
| 2025/0383251 | A1 * | 12/2025 | Okuyama | G01L 3/102 |

* cited by examiner

MAGNETOSTRICTIVE TORQUE SENSOR

CROSS-REFERENCE TO RELATED APPLICATIONS

The present application is based on Japanese patent application No. 2023-047969 filed on Mar. 24, 2023, the entire contents of which are incorporated herein by reference.

TECHNICAL FIELD

The present invention relates to a magnetostrictive torque sensor to detect torque transmitted by a rotating shaft exhibiting a magnetostrictive effect.

BACKGROUND OF THE INVENTION

Conventionally, magnetostrictive torque sensors are used to detect torque of, e.g., an output rotating shaft of an automobile engine, etc. Magnetostrictive torque sensors are configured to detect torque applied to a rotating shaft based on changes in the inductance of a detection coil placed around the rotating shaft, using the magnetostrictive effect in which the magnetic permeability of the rotating shaft changes due to stress. The present applicant has proposed a magnetostrictive torque sensor that has a flexible substrate having plural detection coils formed thereon and placed around a rotating shaft and detects torque applied to the rotating shaft based on changes in the inductances of the plural detection coils (see Patent Literature 1).

In the magnetostrictive torque sensor described in Patent Literature 1, the flexible substrate having plural detection coils is housed in a resin housing. Plural terminals are provided at an end of the flexible substrate, and signal lines of a cable are connected to these terminals inside the resin housing. The cable is led out of the resin housing and is connected to a control device.

Citation List Patent Literature 1: JP2022-74405A

SUMMARY OF THE INVENTION

It is sometimes difficult to secure installation spaces of torque sensors around rotating shafts, and there is a demand for reducing the size of torque sensors. The invention was made in response to this demand, and it is an object of the invention to provide a magnetostrictive torque sensor that can be reduced in size.

To achieve the object described above, the invention provides a magnetostrictive torque sensor configured to be attached around a rotating shaft exhibiting a magnetostrictive effect and detects torque transmitted by the rotating shaft, the magnetostrictive torque sensor comprising:

a holder being composed of a resin and comprising a cylinder portion with a hollow cavity in a center through which the rotating shaft is inserted;

a flexible substrate that comprises a detection portion on which a coil group comprising a combination of a plurality of detection coils aligned in a predetermined direction is formed by a wiring pattern, and a signal line portion on which a plurality of signal lines electrically connecting the coil group to an external device are formed by a wiring pattern; and a magnetic ring with a cylindrical shape comprising a soft magnetic material and being arranged around an outer circumference of the cylinder portion of the holder, wherein the flexible substrate is arranged in such a manner that the detection portion is curved and located between the cylinder portion of the holder and the magnetic ring, and a portion of the signal line portion is led out of the holder, wherein the holder comprises an annular wall surrounding an outer circumference of one axial end of the magnetic ring, wherein the magnetic ring comprises a retention hole that opens on an outer circumferential surface facing an inner circumferential surface of the annular wall, and wherein the holder and the magnetic ring are fixed by a shaft-shaped fastener that penetrates the annular wall and is inserted into the retention hole of the magnetic ring.

Advantageous Effects of the Invention

According to the invention, it is possible to reduce the size of the magnetostrictive torque sensor, allowing for installation space saving.

DETAILED DESCRIPTION OF THE INVENTION

Embodiment

Figure 1:
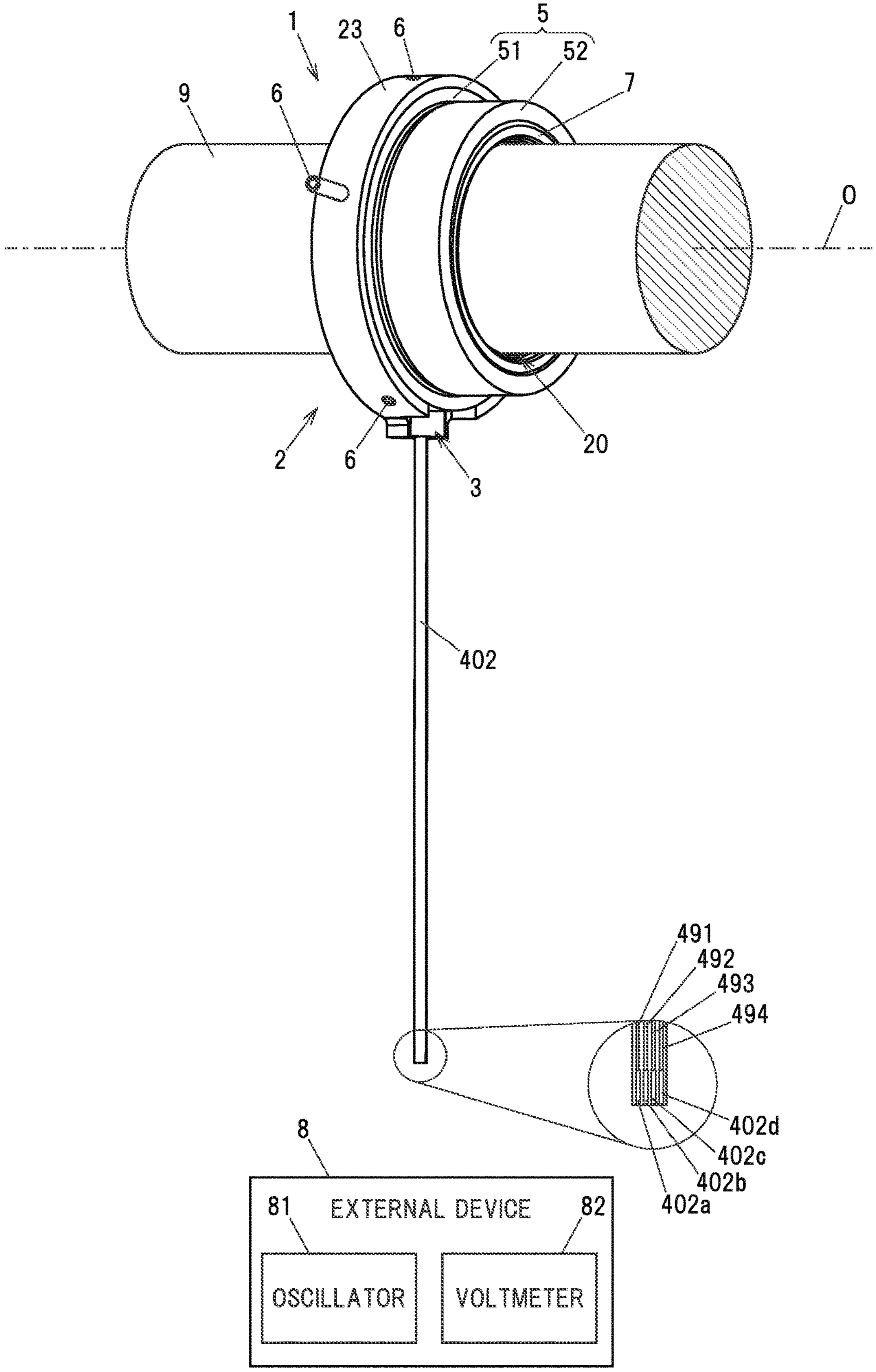
FIG. 1 is a perspective view showing a magnetostrictive torque sensor in an embodiment of the present invention, which is shown together with a rotating shaft to be subjected to detection.
Figure 2:
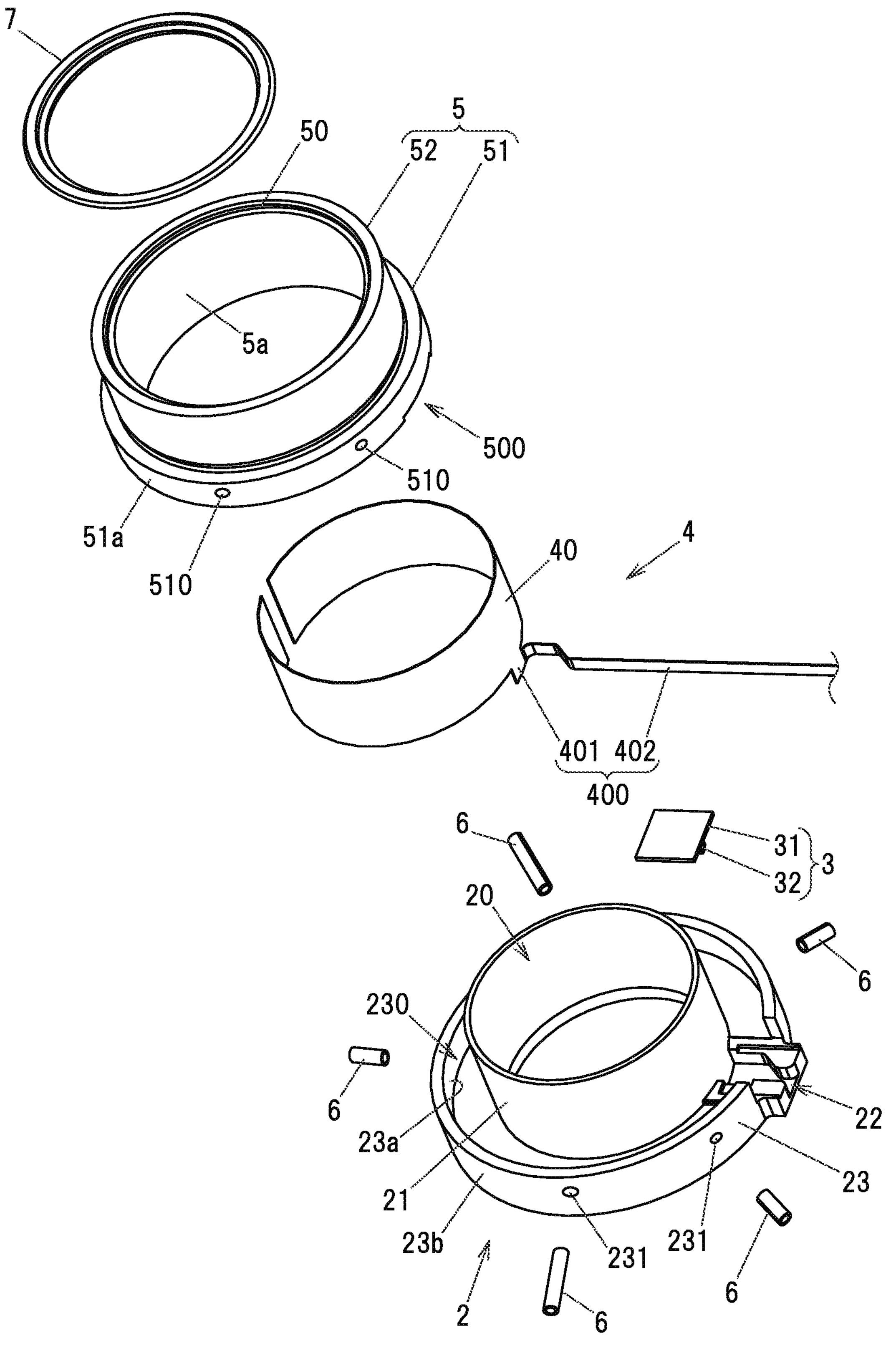
FIG. 2 is an exploded perspective view showing the magnetostrictive torque sensor.
Figure 3:
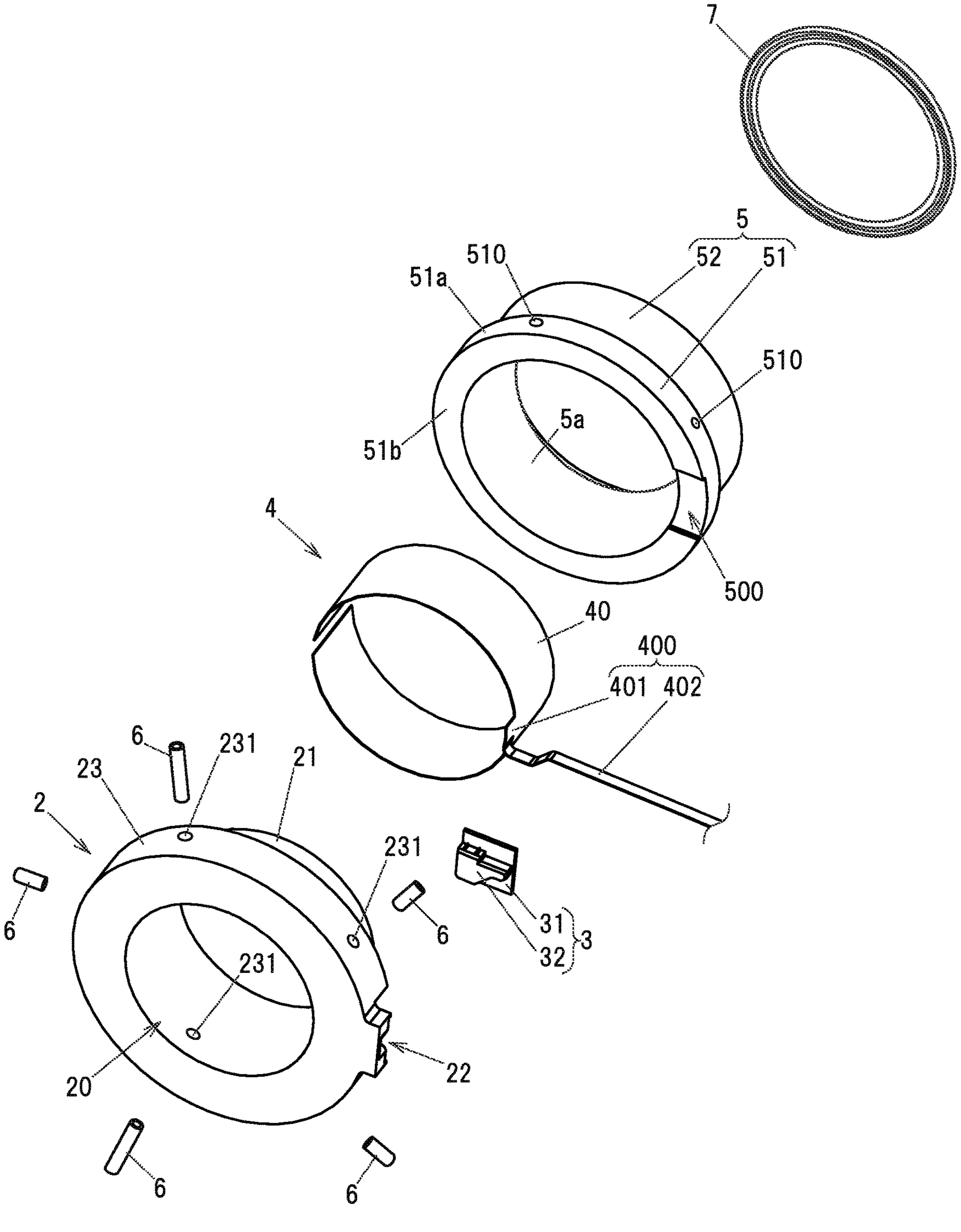
FIG. 3 is an exploded perspective view showing the magnetostrictive torque sensor when viewed in a direction different from in FIG. 2.
Figure 4:
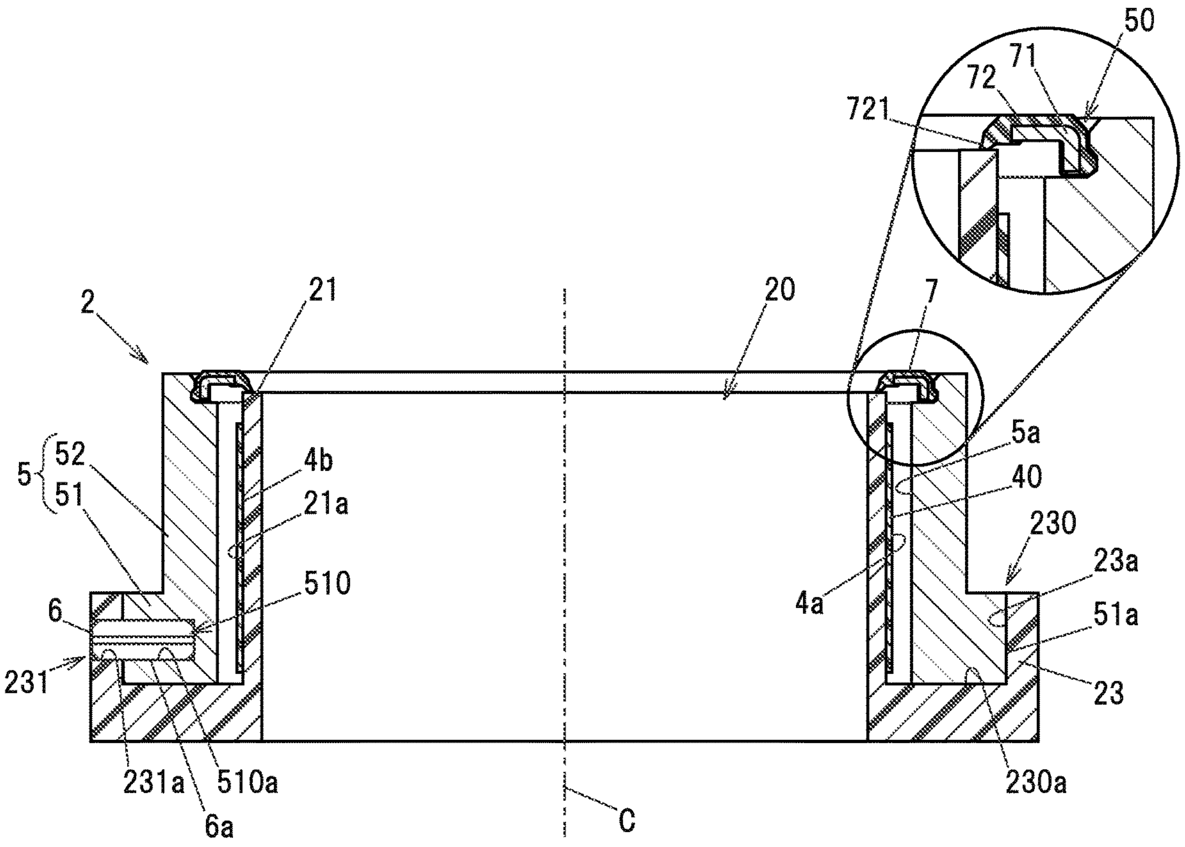
FIG. 4 is a cross-sectional view showing the magnetostrictive torque sensor.

FIG. 1 is a perspective view showing a magnetostrictive torque sensor 1 in an embodiment of the invention, which is shown together with a rotating shaft 9 to be subjected to detection. FIG. 2 is an exploded perspective view showing the magnetostrictive torque sensor 1. FIG. 3 is an exploded perspective view showing the magnetostrictive torque sensor 1 when viewed in a direction different from in FIG. 2. FIG. 4 is a cross-sectional view showing the magnetostrictive torque sensor 1.

The magnetostrictive torque sensor 1 is attached around the rotating shaft 9 and detects torque transmitted by the rotating shaft 9. The rotating shaft 9 is, e.g., a shaft that transmits a driving force of a drive source such as an automobile engine or electric motor. The torque detection result obtained by the magnetostrictive torque sensor 1 is used to control the drive source or an automatic transmission, etc.

The rotating shaft 9 is a ferromagnetic material exhibiting a magnetostrictive effect, and rotates around a rotation axis O to transmit torque. Here, the magnetostrictive effect is a phenomenon in which the shape of a ferromagnetic material is distorted when the ferromagnetic material is magnetized by applying a magnetic field. By using this phenomenon in an opposite manner and detecting changes in magnetic properties caused by distortion of the shape, it is possible to detect torque applied to the rotating shaft 9. It is possible to suitably use the rotating shaft 9 obtained by, e.g., carburizing, quenching and tempering a shaft-shaped body made of chrome steel containing chrome, such as a chrome steel, a chrome-molybdenum steel or a nickel-chrome molybdenum steel, and further performing shot peening. Hereinafter, a direction parallel to the rotation axis O of the rotating shaft 9 will be referred to as an axial direction.

The magnetostrictive torque sensor 1 has a holder 2, a cover member 3, a flexible substrate 4, a cylindrical magnetic ring 5 made of a soft magnetic material, shaft-shaped fasteners 6 to fix the holder 2 and the magnetic ring 5, a lip seal 7 arranged between the holder 2 and the magnetic ring 5, and an external device 8 arranged outside the holder 2. The external device 8 has an oscillator 81 and a voltmeter 82, and the oscillator 81 and the voltmeter 82 are electrically connected to the flexible substrate 4. The operation of the external device 8 will be described later.

The holder 2 is made of, e.g., a resin material such as PPS (polyphenylene sulfide). The holder 2 is formed, e.g., by injection molding. However, it is not limited thereto, and the holder 2 may be formed using a 3D modeling device such as 3D printer. The holder 2 has the cylinder portion 21 with a hollow cavity 20 in the center through which the rotating shaft 9 is inserted, a recessed portion 22 to house a portion of the flexible substrate 4, and an annular wall 23 that surrounds an outer circumference of one axial end of the magnetic ring 5. A central axis C of the cylinder portion 21 coincides with the rotation axis O of the rotating shaft 9. The recessed portion 22 is provided on the outer side of the cylinder portion 21. The annular wall 23 is provided around an outer circumference of the cylinder portion 21 except for the portion where the recessed portion 22 is formed. An annular groove 230 to house the one axial end of the magnetic ring 5 is formed between the cylinder portion 21 and the annular wall 23. Both the recessed portion 22 and the annular groove 230 are open on one side in the axial direction.

The cover member 3 is made of, e.g., the same resin material as the holder 2 and integrally has a plate portion 31 covering the one side of the recessed portion 22 in the axial direction, and a raised portion 32 fitted into the recessed portion 22. The details of the shapes of the cover member 3 and the recessed portion 22 will be described later.

The magnetic ring 5 is made of, e.g., steel or a sintered magnetic material, is formed in a cylindrical shape with an inner diameter larger than an outer diameter of the cylinder portion 21 of the holder 2, and is arranged around the outer circumference of the cylinder portion 21. When the magnetic ring 5 is made of steel, a magnetic steel material such as electromagnetic stainless steel can be suitably used and, e.g., deep drawing can be used as the forming method. Alternatively, the magnetic ring 5 may be formed by cutting a long pipe-shaped steel material to a predetermined length. The magnetic ring 5 is aligned with the cover member 3 in the axial direction and restricts movement of the cover member 3 in a direction in which the raised portion 32 separates away from the recessed portion 22 of the holder 2.

In the present embodiment, the magnetic ring 5 integrally has a large diameter portion 51 and a small diameter portion 52 which have different outer diameters. An inner diameter of the large diameter portion 51 and an inner diameter of the small diameter portion 52 are the same. The large diameter portion 51 is provided at the one axial end of the magnetic ring 5 and is housed in the annular groove 230 of the holder 2. The annular wall 23 of the holder 2 surrounds an outer circumference of the large diameter portion 51. By fitting the large diameter portion 51 into the annular groove 230 in a spigot and socket manner, the magnetic ring 5 is positioned relative to the holder 2 in a radial direction perpendicular to the central axis C. In more particular, by an arrangement in which an outer circumferential surface 51*a* of the large diameter portion 51 faces an inner circumferential surface 23*a* of the annular wall 23, the holder 2 and the magnetic ring 5 are positioned relative to each other in the radial direction.

As shown in FIG. 3, on an axial end surface 51*b* of the large diameter portion 51 of the magnetic ring 5, a notch 500 recessed from the end surface 51*b* in the axial direction is formed on a portion facing the plate portion 31 of the cover member 3. When the cover member 3 and the magnetic ring 5 are assembled to the holder 2, a portion of the plate portion 31 of the cover member 3 is housed in the notch 500 and the end surface 51*b* of the large diameter portion 51 is in contact with a bottom surface 230*a* of the annular groove 230.

Figure 5A:
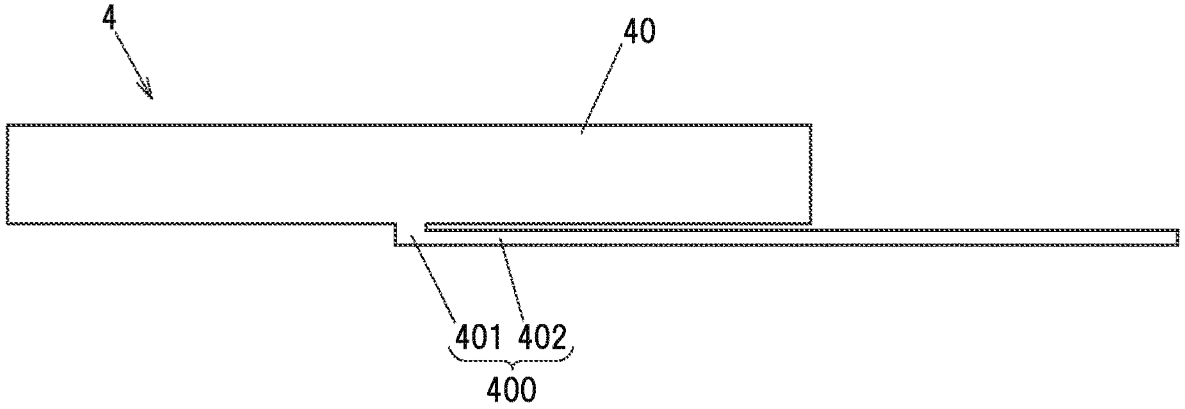
FIG. 5A is a plan view showing one flexible substrate.
Figure 5B:
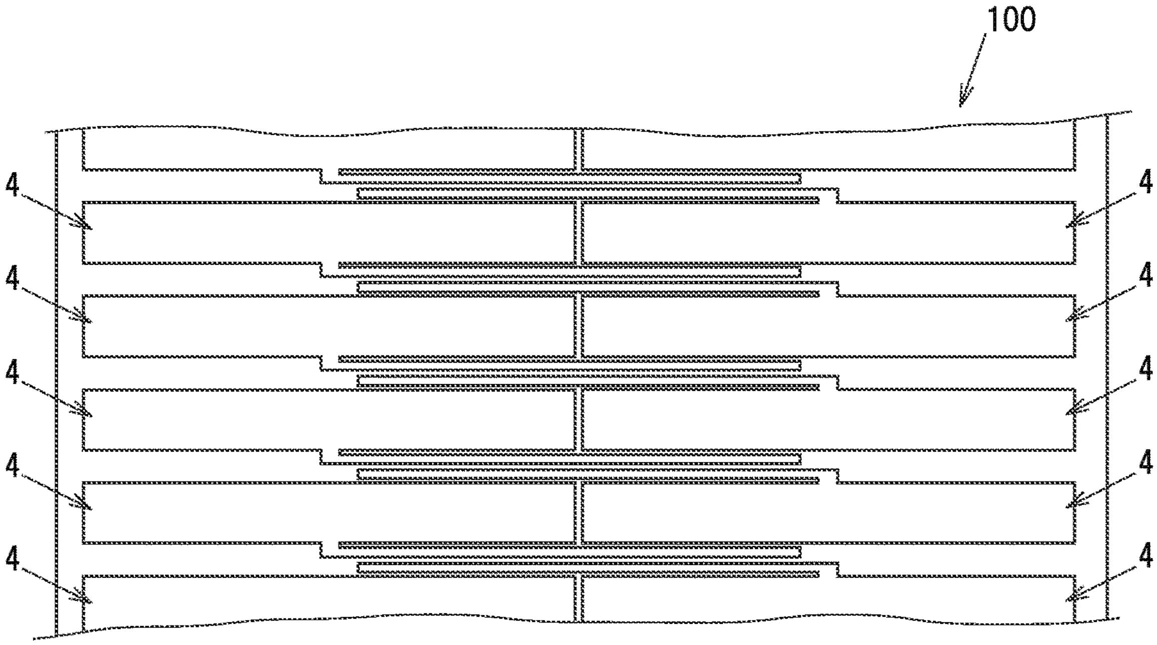
FIG. 5B is a plan view showing a base material from which plural flexible substrates are cut out.

FIG. 5A is a plan view showing one flexible substrate 4. FIG. 5B is a plan view showing a base material 100 from which plural flexible substrates 4 are cut out. The flexible substrate 4 is manufactured by cutting the base material 100.

The flexible substrate 4 integrally (e.g., as one piece) has a detection portion 40 having plural detection coils to detect a magnetic field of the rotating shaft 9, and a signal line portion 400 on which plural signal lines electrically connecting the external device 8 to the detection portion 40 are formed by a wiring pattern. The plural detection coils and the plural signal lines are not shown in FIGS. 5A and 5B. The flexible substrate 4 is arranged in such a manner that the detection portion 40 is curved and located between the cylinder portion 21 of the holder 2 and the magnetic ring 5, and a portion of the signal line portion 400 is led out of the holder 2. On the detection portion 40, coil groups, each composed of a combination of the plural detection coils aligned in a predetermined direction, are formed by wiring patterns. The detection portion 40 has a rectangular shape with a long-side direction coincident with an alignment direction of the plural detection coils.

The signal line portion 400 has a protruding portion 401 protruding from the detection portion 40 in a direction perpendicular to the long-side direction, and a linear portion 402 extending from the protruding portion 401 in the long-side direction. This shape of the flexible substrate 4 allows plural flexible substrates 4 to be cut out of the base material 100 with a reduced wasted area as shown in FIG. 5B, which can improve the yield. A length of the linear portion 402 is, e.g., 50 mm or more and 100 mm or less.

A portion of the linear portion 402 including a tip portion and excluding a base end portion near the protruding portion 401 is led out of the holder 2. First to fourth electrodes 402*a* to 402*d* are formed at the tip portion of the linear portion 402, as shown enlarged in FIG. 1. The linear portion 402 of the flexible substrate 4 may be directly connected to the external device 8, or may be connected to the external device 8 through a cable having plural electric wires. Next, an example configuration of the detection portion 40 will be described in detail with reference to FIGS. 6 to 8.

Figure 6:
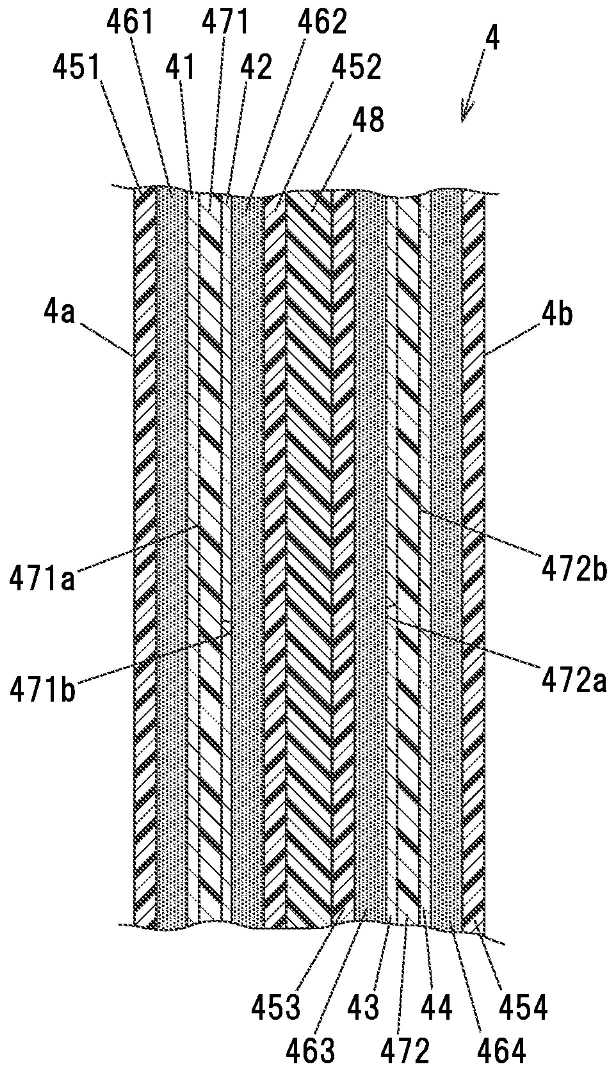
FIG. 6 is a cross-sectional view showing a layer structure of the flexible substrate.

FIG. 6 is a cross-sectional view showing a layer structure of the flexible substrate 4. The flexible substrate 4 has a multilayer structure which has first to fourth wiring layers 41 to 44 and in which a coverlay film 451, an adhesive layer 461, the first wiring layer 41, a first base film 471, the second wiring layer 42, an adhesive layer 462, a coverlay film 452, a double-sided tape 48, a coverlay film 453, an adhesive layer 463, the third wiring layer 43, a second base film 472, the fourth wiring layer 44, an adhesive layer 464 and a coverlay film 454 are stacked in this order from one surface 4*a*, which is located on the outer side of the curve when wrapped around the outer circumference of the cylinder portion 21, to the other surface 4*b* on the inner side of the curve.

The first wiring layer 41 and the second wiring layer 42 are wiring patterns formed by etching copper foil and are respectively formed on a front surface 471*a* and a back surface 471*b* of the first base film 471. Likewise, the third wiring layer 43 and the fourth wiring layer 44 are wiring patterns formed by etching copper foil and are respectively formed on a front surface 472*a* and a back surface 472*b* of the second base film 472. The coverlay films 451, 452, 453, 454 are protective films adhered to the first to fourth wiring layers 41 to 44 by the adhesive layers 461, 462, 463, 464. The first and second base films 471, 472 and the coverlay films 451, 452, 453, 454 are made of an insulating resin such as polyimide.

Figures 7A, 7B, 7C, 7D:
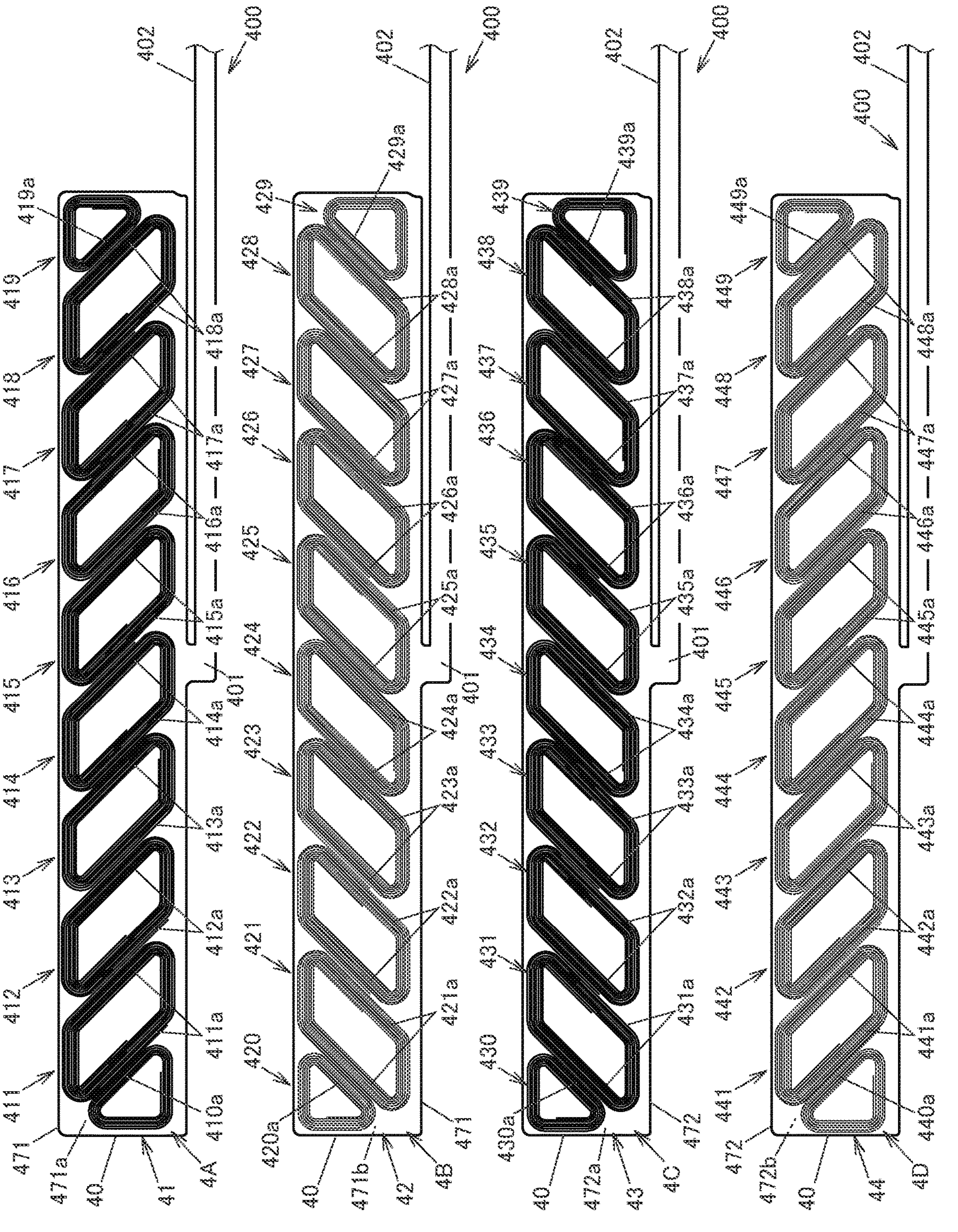
FIGS. 7A to 7D are plan views showing first to fourth wiring layers.

FIG. 7A is a plan view showing a wiring pattern of the first wiring layer 41 formed on the front surface 471*a* of the first base film 471. FIG. 7B is a plan view showing a wiring pattern of the second wiring layer 42 when viewed from the front surface 471*a* side of the first base film 471. FIG. 7C is a plan view showing a wiring pattern of the third wiring layer 43 formed on the front surface 472*a* of the second base film 472. FIG. 7D is a plan view showing a wiring pattern of the fourth wiring layer 44 when viewed from the front surface 472*a* side of the second base film 472.

On the first wiring layer 41, first to tenth detection coils 410 to 419 aligned in the long-side direction of the detection portion 40 are formed by a wiring pattern. The first and tenth detection coils 410 and 419 have a triangular shape, and the second to ninth detection coils 411 to 418 have a parallelogram shape. Likewise, on the second wiring layer 42, first to tenth detection coils 420 to 429 aligned in the long-side direction of the detection portion 40 are formed by a wiring pattern. The first and tenth detection coils 420 and 429 have a triangular shape, and the second to ninth detection coils 421 to 428 have a parallelogram shape.

On the third wiring layer 43, first to tenth detection coils 430 to 439 aligned in the long-side direction of the detection portion 40 are formed by a wiring pattern. The first and tenth detection coils 430 and 439 have a triangular shape, and the second to ninth detection coils 431 to 438 have a parallelogram shape. Likewise, on the fourth wiring layer 44, first to tenth detection coils 440 to 449 aligned in the long-side direction of the detection portion 40 are formed by a wiring pattern. The first and tenth detection coils 440 and 449 have a triangular shape, and the second to ninth detection coils 441 to 448 have a parallelogram shape.

The first to tenth detection coils 410 to 419 of the first wiring layer 41 and the first to tenth detection coils 440 to 449 of the fourth wiring layer 44 respectively have straight portions 410*a* to 419*a* and 440*a* to 449*a* which are inclined toward one side at a predetermined angle (+45°) relative to a short-side direction of the detection portion 40. The first to tenth detection coils 420 to 429 of the second wiring layer 42 and the first to tenth detection coils 430 to 439 of the third wiring layer 43 have respectively straight portions 420*a* to 429*a* and 430*a* to 439*a* which are inclined toward the other side at the predetermined angle (−45°) relative to the short-side direction of the detection portion 40.

Figure 8:
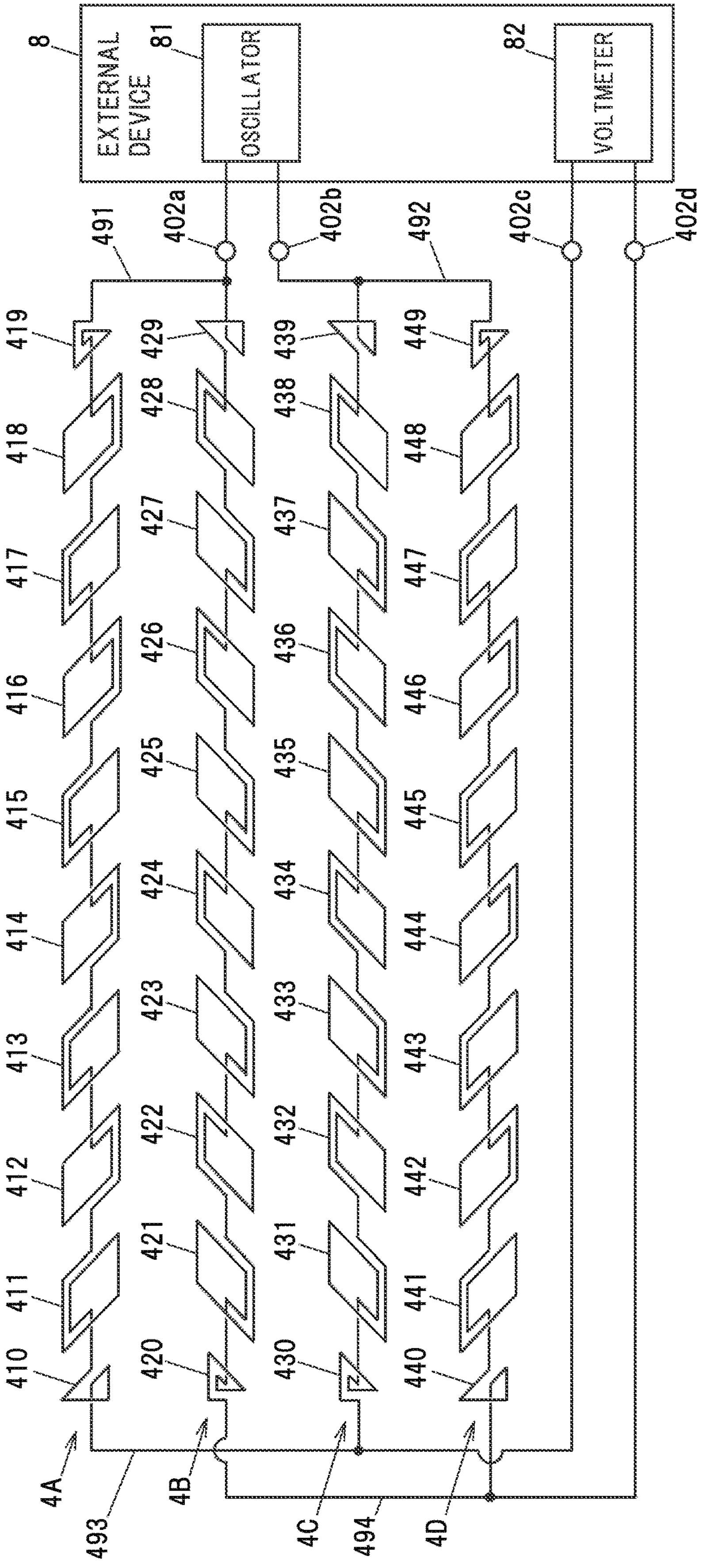
FIG. 8 is a schematic circuit diagram illustrating a configuration example of an electric circuit composed of the flexible substrate, an oscillator and a voltmeter.

FIG. 8 is a schematic circuit diagram illustrating a configuration example of an electric circuit composed of the flexible substrate 4, the oscillator 81 and the voltmeter 82. The first to tenth detection coils 410 to 419 of the first wiring layer 41 are connected in series to form a first coil group 4A, and the first to tenth detection coils 420 to 429 of the second wiring layer 42 are connected in series to form a second coil group 4B. Likewise, the first to tenth detection coils 430 to 439 of the third wiring layer 43 are connected in series to form a third coil group 4C, and the first to tenth detection coils 440 to 449 of the fourth wiring layer 44 are connected in series to form a fourth coil group 4D.

The first coil group 4A and the third coil group 4C, and the second coil group 4B and the fourth coil group 4D, are connected respectively in series between the first electrode 402*a* and the second electrode 402*b*. One end of the first coil group 4A and one end of the second coil group 4B are connected to the first electrode 402*a* by a first signal line 491. One end of the third coil group 4C and one end of the fourth coil group 4D are connected to the second electrode 402*b* by a second signal line 492.

A third signal line 493, which connects the other end of the first coil group 4A and the other end of the third coil group 4C in series, is connected to the third electrode 402*c*. A fourth signal line 494, which connects the other end of the second coil group 4B and the other end of the fourth coil group 4D in series, is connected to the fourth electrode 402*d*. The first to fourth signal lines 491 to 494 are formed by a wiring pattern on the signal line portion 400. The oscillator 81 applies an AC voltage between the first electrode 402*a* and the second electrode 402*b*. The voltmeter 82 measures a voltage between the third electrode 402*c* and the fourth electrode 402*d*.

When torque is applied to the rotating shaft 9, magnetic permeability in the direction at +45 degrees from the axial direction decreases (or increases) and magnetic permeability in the direction at −45 degrees from the axial direction increases (or decreases). Therefore, when torque is applied to the rotating shaft 9 in a state in which AC voltage is applied from the oscillator 81, inductances of the first coil group 4A and the fourth coil group 4D decrease (or increase) and inductances of the second coil group 4B and the third coil group 4C increase (or decrease). Since this results in a change in the voltage measured by the voltmeter 82, the torque applied to the rotating shaft 9 can be detected based on this change in voltage.

Note that FIGS. 7A to 7D do not show wiring patterns of portions connecting in series between the first to tenth detection coils 410 to 419, 420 to 429, 430 to 439 and 440 to 449 of the first to fourth wiring layers 41 to 44, and wiring patterns constituting the first to fourth signal lines 491 to 494.

The detection portion 40 is wrapped around the outer circumference of the cylinder portion 21 of the holder 2, and the other surface 4*b* is adhered to an outer circumferential surface 21*a* of the cylinder portion 21 of the holder 2 with an adhesive. The magnetic ring 5 is arranged so as to surround an outer circumference of the detection portion 40. The magnetic ring 5 increases the magnetic flux linking with each of the detection coils 410 to 419, 420 to 429, 430 to 439 and 440 to 449, thereby increasing the sensitivity of the magnetostrictive torque sensor 1. A space is formed between the one surface 4*a* of the detection portion 40 and an inner circumferential surface 5*a* of the magnetic ring 5, so that the flexible substrate 4 and the magnetic ring 5 are not in contact with each other. Ingress of foreign matter into this space is suppressed by the lip seal 7.

As shown enlarged in FIG. 4, the lip seal 7 has a core 71 and a rubber material 72 vulcanized and bonded to the core 71, and a portion of the rubber material 72 serves as a lip portion 721 that is in elastic contact with the cylinder portion 21 of the holder 2. On the inner circumferential surface 5*a* of the magnetic ring 5, a step portion 50 to which the lip seal 7 is fitted is formed at an end of the small diameter portion 52 opposite to the large diameter portion 51.

Figure 9A:
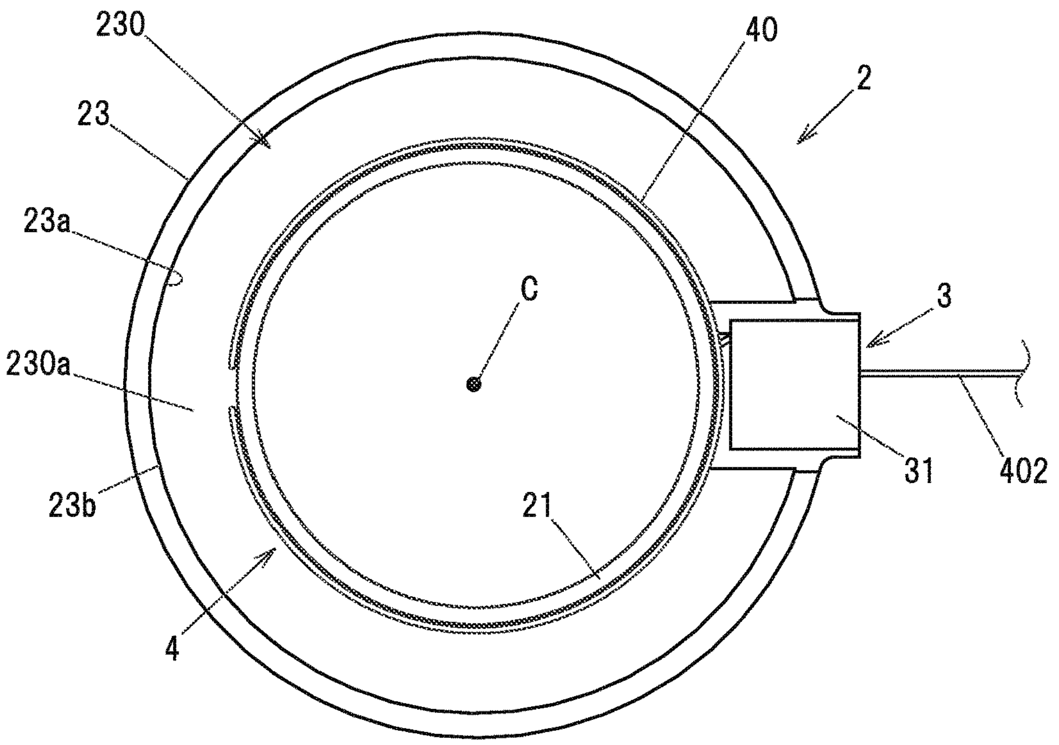
FIG. 9A is a configuration diagram illustrating a state in which a cover member and the flexible substrate are attached to a holder, as viewed in an axial direction.
Figure 9B:
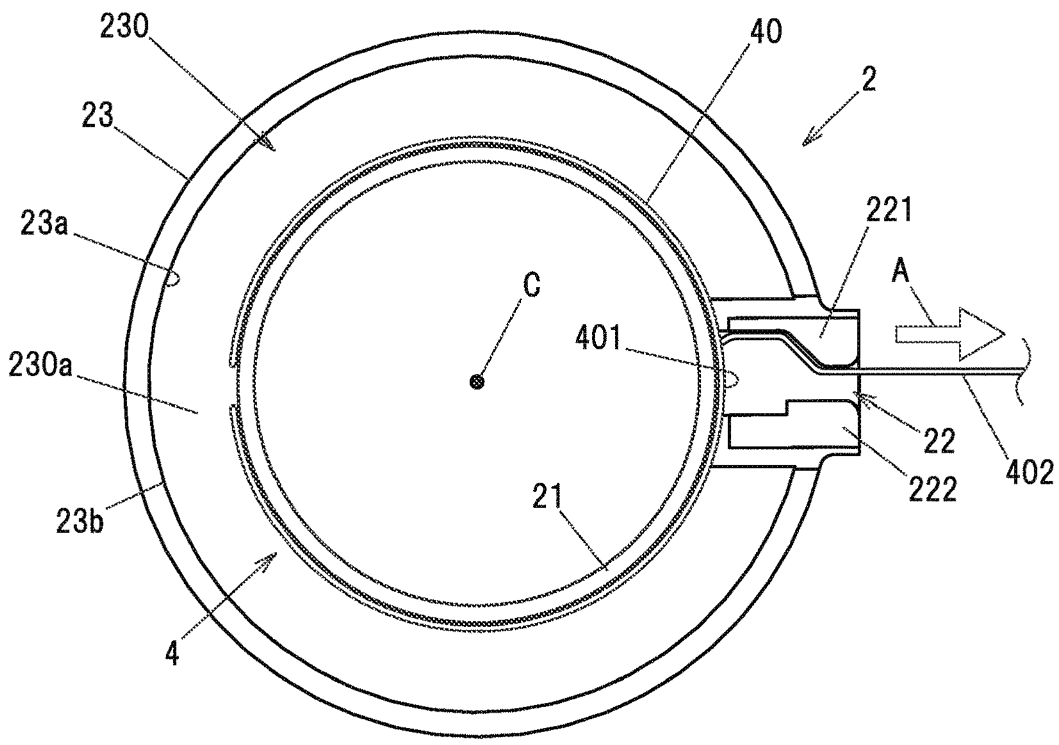
FIG. 9B is a configuration diagram in which illustration of the cover member is omitted from the state shown in FIG. 9A.
Figure 10A:
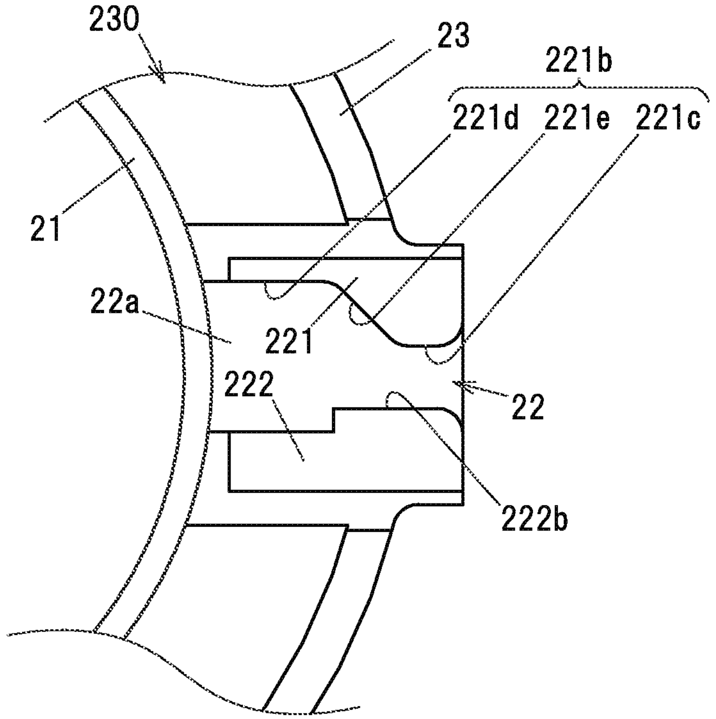
FIG. 10A is a configuration diagram illustrating a recessed portion of the holder as viewed in the axial direction.
Figure 10B:
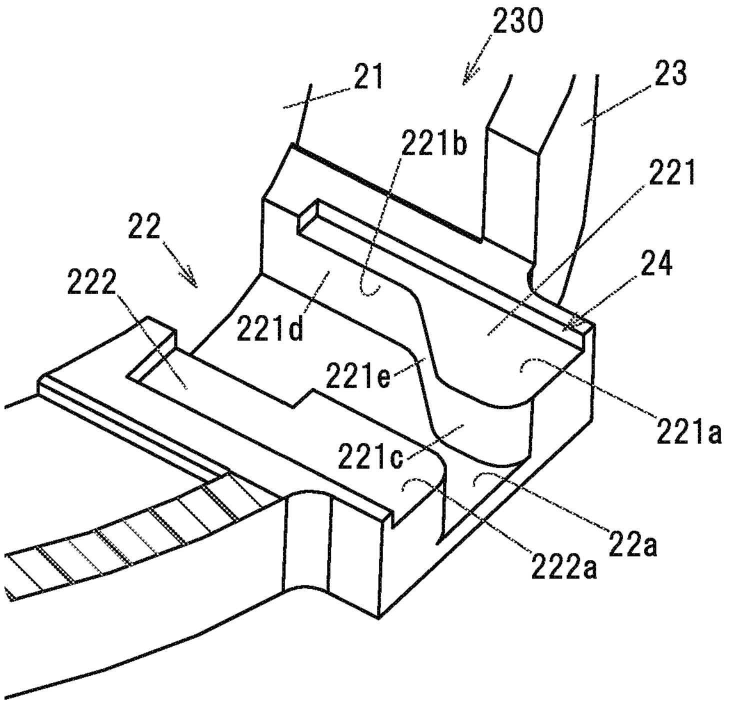
FIG. 10B is a perspective view showing a portion around the recessed portion.
Figure 11A:
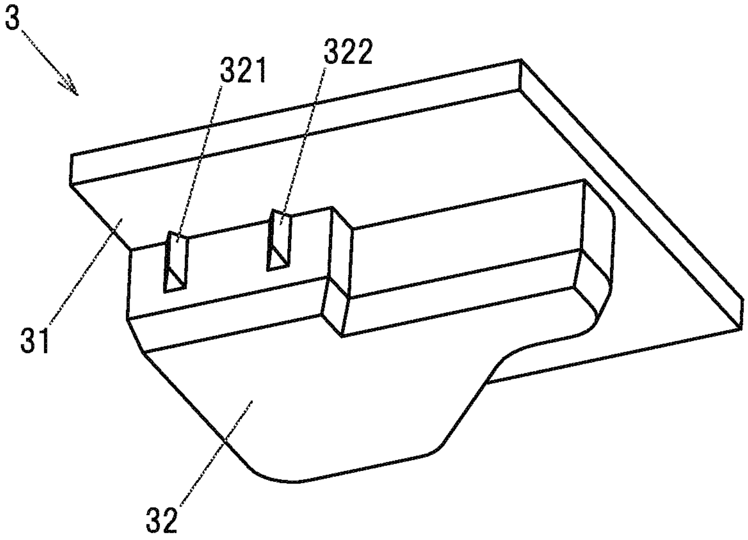
FIGS. 11A and 11B are perspective views showing the cover member.
Figure 11B:
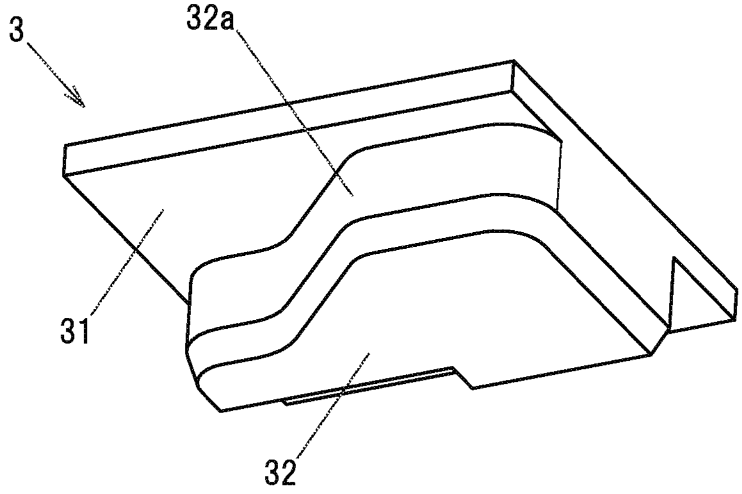

FIG. 9A is a configuration diagram illustrating a state in which the cover member 3 and the flexible substrate 4 are attached to the holder 2, as viewed in the axial direction. FIG. 9B is a configuration diagram in which illustration of the cover member 3 is omitted from the state shown in FIG. 9A. FIG. 10A is a configuration diagram illustrating the recessed portion 22 of the holder 2 as viewed in the axial direction. FIG. 10B is a perspective view showing a portion around the recessed portion 22. FIGS. 11A and 11B are perspective views showing the cover member 3 as viewed from different directions. FIG. 10B shows a state in which a portion of the annular wall 23 on the near side of the drawing relative to the recessed portion 22 is cut off.

The recessed portion 22 houses a portion of the linear portion 402 near the protruding portion 401. A plate portion housing portion 24 to house the plate portion 31 of the cover member 3 is formed on one side of the recessed portion 22 in the axial direction. The magnetic ring 5 stops the plate portion 31 of the cover member 3 from slipping out of the plate portion housing portion 24. The recessed portion 22 is formed between a first wall portion 221 and a second wall portion 222 of the holder 2. The first wall portion 221 and the second wall portion 222 are provided so as to protrude in the axial direction from a bottom surface 22*a* of the recessed portion 22. The plate portion 31 of the cover member 3 is in contact with a top surface 221*a* of the first wall portion 221 and a top surface 222*a* of the second wall portion 222. The linear portion 402 is bent inside the recessed portion 22 and is led out of the holder 2 so as to extend in the radial direction which is perpendicular to a circumferential direction of the cylinder portion 21.

The first wall portion 221 and the second wall portion 222 face each other with the recessed portion 22 in between. A facing surface 221*b* of the first wall portion 221, which is the surface facing the second wall portion 222, and a facing surface 222*b* of the second wall portion 222, which is the surface facing the first wall portion 221, are inner surfaces of the recessed portion 22. The linear portion 402 of the flexible substrate 4 is curved along the facing surface 221*b* of the first wall portion 221 and is sandwiched and held between the facing surface 221*b* of the first wall portion 221 and an outer circumferential surface 32*a* of the raised portion 32 of the cover member 3. The surfaces (the one surface 4*a* and the other surface 4*b*) of the linear portion 402 inside the recessed portion 22 are parallel to the central axis C of the cylinder portion 21, and the linear portion 402 is curved in the thickness direction thereof inside the recessed portion 22.

Curving the linear portion 402 in this manner prevents lifting of a portion of the detection portion 40 from the cylinder portion 21 due to the restoring force of the curved linear portion 402. That is, if the linear portion 402 extends in a direction perpendicular to the long-side direction of the detection portion 40 and the linear portion 402 is curved near the detection portion 40, the detection portion 40 near the base of the linear portion 402 may be lifted from the cylinder portion 21 by the restoring force of the linear portion 402, causing a decrease in detection accuracy. However, in the present embodiment, such lifting can be suppressed since the signal line portion 400 extends from the protruding portion 401 along the long-side direction of the detection portion 40.

The facing surface 221*b* of the first wall portion 221 includes an exit-side guide surface 221*c* in contact with the linear portion 402 near an exit of the recessed portion 22 which is located on the outer circumferential end side of the holder 2, an entrance-side guide surface 221*d* in contact with the linear portion 402 near an entrance of the recessed portion 22 which is located near the cylinder portion 21, and an inclined guide surface 221*e* between the exit-side guide surface 221*c* and the entrance-side guide surface 221*d*. The linear portion 402 extends along the entrance-side guide surface 221*d*, the inclined guide surface 221*e* and the exit-side guide surface 221*c* inside the recessed portion 22.

The exit-side guide surface 221*c* is a flat surface along a direction perpendicular to the central axis C of the cylinder portion 21. The entrance-side guide surface 221*d* is a flat surface parallel to the exit-side guide surface 221*c* and is offset from the exit-side guide surface 221*c* in a direction away from the second wall portion 222. The inclined guide surface 221*e* is an inclined surface inclined with respect to a direction perpendicular to the central axis C of the cylinder portion 21 and forms an obtuse angle with the entrance-side guide surface 221*d* and the exit-side guide surface 221*c*.

The raised portion 32 of the cover member 3 has plural protrusions 321, 322 as shown in FIG. 11A that are pressed against the facing surface 222*b* of the second wall portion 222, the plural protrusions 321, 322 pressed against the facing surface 222*b* of the second wall portion 222 cause elastic deformation of the raised portion 32, and the raised portion 32 is pressed by its restoring force toward the first wall portion 221.

The linear portion 402 is sandwiched and held inside the recessed portion 22, hence, even if the linear portion 402 outside the holder 2 is pulled, reach of the pulling force to the detection portion 40 through the protruding portion 401 is suppressed and a decrease in detection accuracy of the magnetostrictive torque sensor 1 is suppressed. In addition, the linear portion 402 is led out of the holder 2 so as to extend in the radial direction perpendicular to the circumferential direction of the cylinder portion 21, hence, even if the linear portion 402 is pulled in the extending direction of the linear portion 402 indicated by the arrow A in FIG. 9B, generation of rotation moment in the holder 2 due to the pulling force is suppressed.

Next, a fixing structure of the holder 2 and the magnetic ring 5 using plural fasteners 6 will be described. The case where the fastener 6 is a spring pin will be described here. The holder 2 and the magnetic ring 5 are fixed by the fasteners 6 that penetrate the annular wall 23 of the holder 2 and are inserted into retention holes 510 of the magnetic ring 5.

Figure 12A:
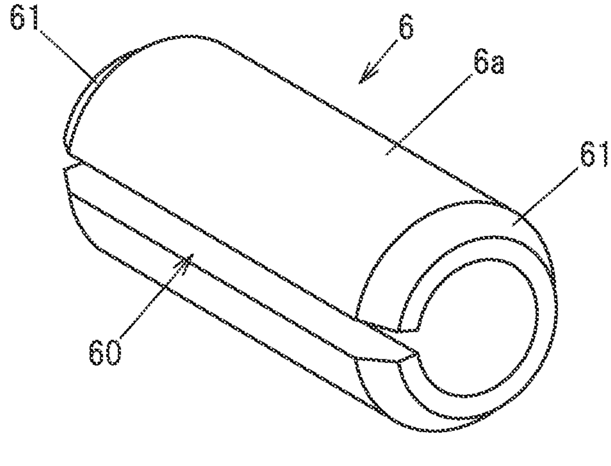
FIG. 12A is a perspective view showing a fastener.
Figure 12B:
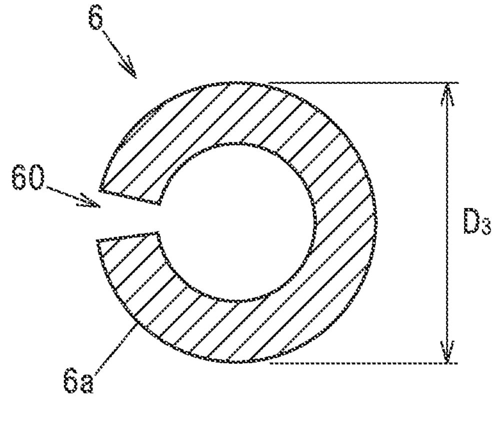
FIG. 12B is a cross-sectional view showing the fastener taken perpendicular to a longitudinal direction.

FIG. 12A is a perspective view showing the fastener 6. FIG. 12B is a cross-sectional view showing the fastener 6 taken perpendicular to the longitudinal direction. The fastener 6 has a C-shaped cross section with a slit 60 extending in the longitudinal direction thereof. Tapered portions 61 are formed at both ends of the fastener 6. The fastener 6 is made of a metal such as spring steel or stainless steel.

Figure 13:
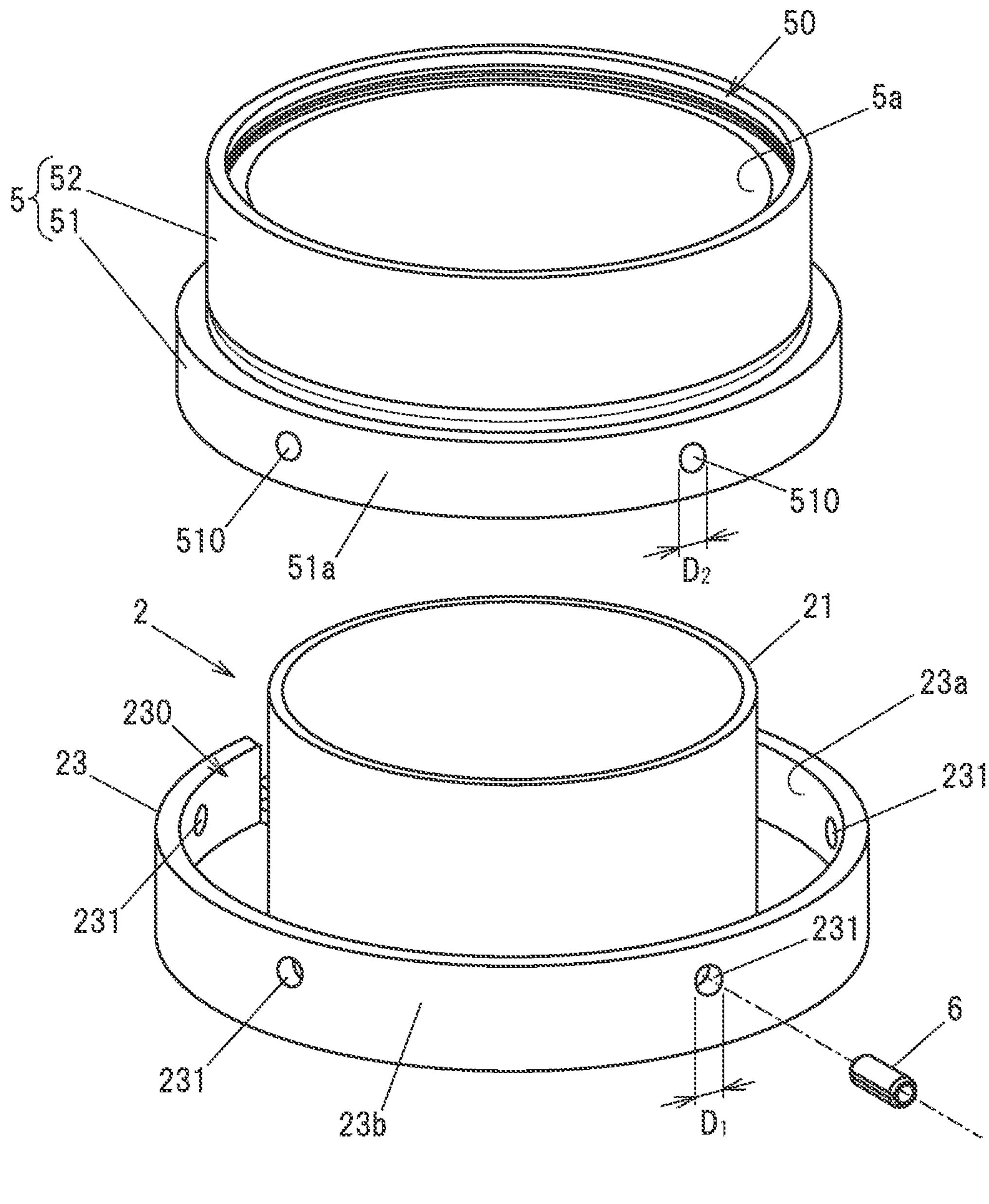
FIG. 13 is a perspective view showing the holder and a magnetic ring, together with the fastener.

FIG. 13 is a perspective view showing the holder 2 and the magnetic ring 5, together with the fastener 6. Plural through-holes 231 which penetrate in the radial direction between an outer circumferential surface 23*b* and the inner circumferential surface 23*a* of the annular wall 23 are formed on the annular wall 23 of the holder 2. The plural retention holes 510 which open on the outer circumferential surface 51*a* are formed on the large diameter portion 51 of the magnetic ring 5. An inner diameter $D_1$ of the through-hole 231 and an inner diameter $D_2$ of the retention hole 510 are smaller than an outer diameter $D_3$ of the fastener 6 before being inserted into the through-hole 231 and the retention hole 510.

When the large diameter portion 51 of the magnetic ring 5 is fitted into the annular groove 230, the plural through-holes 231 are respectively in communication with the retention holes 510. Each fastener 6 is elastically reduced in diameter by the narrowing of the width of the slit 60 and is inserted into the through-hole 231 and the retention hole 510. The retention hole 510 is a blind hole that does not penetrate the magnetic ring 5 in the radial direction as shown in FIG. 4, and the fastener 6 is inserted to the deepest portion of the retention hole 510. When the fastener 6 is inserted into the through-hole 231 and the retention hole 510, an outer circumferential surface 6*a* of the fastener 6 comes in clastic contact with an inner surface 231*a* of the through-hole 231 and an inner circumferential surface 510*a* of the retention hole 510 due to the restoring force of the elastically deformed fastener 6.

In the present embodiment, the holder 2 and the magnetic ring 5 are fixed to each other by five fasteners 6. In addition, in the present embodiment, two of the five fasteners 6 are longer than the other three fasteners 6 and protrude in the radial direction from the outer circumferential surface 23*b* of the annular wall 23. The length of the other three fasteners 6 is equal to the combined length of the through-hole 231 and the retention hole 510. The two fasteners 6 protruding radially from the outer circumferential surface 23*b* of the annular wall 23 also serve as anti-rotation members to stop rotation of the holder 2 and the magnetic ring 5 relative to an attachment target.

Figure 14:
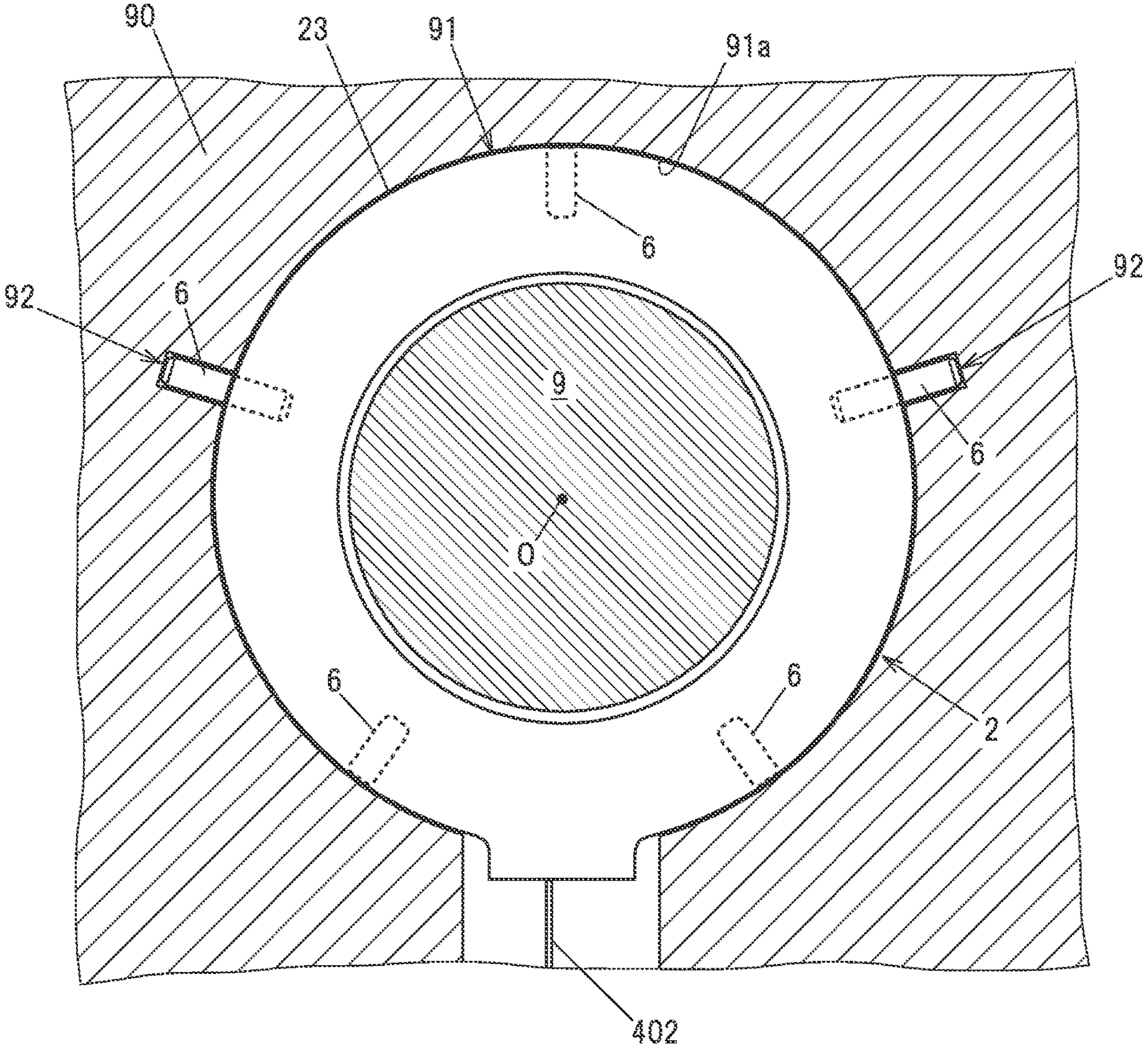
FIG. 14 is an explanatory diagram illustrating the magnetostrictive torque sensor attached to a housing.

FIG. 14 is an explanatory diagram illustrating a state in which the magnetostrictive torque sensor 1 is attached to a housing 90 which is the attachment target. The housing 90 has a fitting hole 91 into which the annular wall 23 of the holder 2 is fitted, and plural slit holes 92 extending radially from an inner circumferential surface 91*a* of the fitting hole 91 along a direction perpendicular to the rotation axis O of the rotating shaft 9. The two fasteners 6 protruding from the annular wall 23 of the holder 2 respectively engage with the slit holes 92, and the holder 2 and the magnetic ring 5 are thereby stopped from rotating relative to the housing 90. The other three fasteners 6 which do not protrude from the annular wall 23 are stopped from coming out of the through-holes 231 by the inner circumferential surface 91*a* of the fitting hole 91. In FIG. 14, these three fasteners 6 are indicated by broken lines.

Alternatively, among the five fasteners 6, only one fastener 6 may protrude from the annular wall 23 of the holder 2. Moreover, all the fasteners 6 may protrude from the annular wall 23. The fastener(s) 6 protruding from the annular wall 23 can serve as the anti-rotation member.

The number of fasteners 6 to fix the holder 2 and the magnetic ring 5 may be one, but it is desirable to fix the holder 2 and the magnetic ring 5 with plural fasteners 6 to ensure fixing strength. When fixing the holder 2 and the magnetic ring 5 with one fastener 6, it is desirable that the fastener 6 be arranged at a position opposite and symmetrical to the recessed portion 22 with respect to the central axis C.

Effects of the Embodiment

In the embodiment described above, the linear portion 402 of the flexible substrate 4 is led out of the holder 2, hence, connection of the flexible substrate 4 to the cable does not need to be inside the holder 2 and the magnetostrictive torque sensor 1 can thereby be reduced in size. Therefore, the magnetostrictive torque sensor 1 can be easily arranged even if the installation space around the rotating shaft 9 is narrow. In addition, by the fasteners 6, it is possible to securely fix the holder 2 and the magnetic ring 5 and also stop the holder 2 and the magnetic ring 5 from rotating relative to the housing 90. Here, since both the magnetic ring 5 and the fasteners 6 are made of metal, wear can be suppressed even when subjected to vibration and durability is improved, as compared to when, e.g., rotation is stopped by engagement of a portion of the holder 2 with the housing 90.

Summary of the Embodiment

Technical ideas understood from the embodiment will be described below citing the reference signs, etc., used for the embodiment. However, each reference sign, etc., described below is not intended to limit the constituent elements in the claims to the members, etc., specifically described in the embodiment.

According to the first feature, a magnetostrictive torque sensor 1, which is attached around a rotating shaft 9 exhibiting a magnetostrictive effect and detects torque transmitted by the rotating shaft 9, includes: a holder made of a resin 2 comprising a cylinder portion 21 with a hollow cavity 20 in the center through which the rotating shaft 9 is inserted; a flexible substrate 4 that includes a detection portion 40 on which a coil group 4A to 4D comprising a combination of a plurality of detection coils 410 to 419, 420 to 429, 430 to 439, 440 to 449 aligned in a predetermined direction is formed by a wiring pattern, and a signal line portion 400 on which a plurality of signal lines 491 to 494 electrically connecting the coil group 4A to 4D to an external device 8 are formed by a wiring pattern; and a magnetic ring 5 with a cylindrical shape being composed of a soft magnetic material and being arranged around an outer circumference of the cylinder portion 21 of the holder 2, wherein the flexible substrate 4 is arranged in such a manner that the detection portion 40 is curved and located between the cylinder portion 21 of the holder 2 and the magnetic ring 5, and a portion of the signal line portion 400 is led out of the holder 2, wherein the holder 2 includes an annular wall 23 surrounding an outer circumference of one axial end of the magnetic ring 5, wherein the magnetic ring 5 includes a retention hole 510 that opens on an outer circumferential surface 51*a* facing an inner circumferential surface 23*a* of the annular wall 23, and wherein the holder 2 and the magnetic ring 5 are fixed by a shaft-shaped fastener 6 that penetrates the annular wall 23 and is inserted into the retention hole 510 of the magnetic ring 5.

According to the second feature, in the magnetostrictive torque sensor 1 as described by the first feature, the detection portion 40 has a rectangular shape with a long-side direction coincident with an alignment direction of the plurality of detection coils 410 to 419, 420 to 429, 430 to 439, 440 to 449, the signal line portion 400 includes a protruding portion 401 protruding from the detection portion 40 in a direction perpendicular to the long-side direction, and a linear portion 402 extending from the protruding portion 401 in the long-side direction, and a portion of the linear portion 402 is led out of the holder 2.

According to the third feature, in the magnetostrictive torque sensor 1 as described by the second feature, the holder 2 includes a recessed portion 22 to house the portion of the linear portion 402, and the linear portion 402 is bent inside the recessed portion 22 and is led out of the holder 2 so as to extend in a direction perpendicular to a circumferential direction of the cylinder portion 21.

According to the fourth feature, the magnetostrictive torque sensor 1 as described by the third feature further includes: a cover member 3 comprising a raised portion 32 fitted into the recessed portion 22 of the holder 2, wherein the linear portion 402 is sandwiched and held between an inner surface (the facing surface 221*b*) of the recessed portion 22 and an outer circumferential surface 32*a* of the raised portion 32.

According to the fifth feature, in the magnetostrictive torque sensor 1 as described by the fourth feature, movement of the cover member 3 in a direction in which the raised portion 32 separates away from the recessed portion 22 of the holder 2 is restricted by the magnetic ring 5.

According to the sixth feature, in the magnetostrictive torque sensor 1 as described by the fifth feature, the detection portion 40 of the flexible substrate 4 is adhered to the cylinder portion 21 of the holder 2, and a space is formed between the detection portion 40 and the magnetic ring 5.

According to the seventh feature, in the magnetostrictive torque sensor 1 as described by the first feature, the fastener 6 protrudes from an outer circumferential surface 23*b* of the annular wall 23, and engagement of the protruding portion of the fastener 6 with an attachment target (the housing 90) stopes the holder 2 and the magnetic ring 5 from rotating relative to the attachment target 90.

Although the embodiment of the invention has been described, the invention according to claims is not to be limited to the embodiment described above. Further, please note that not all combinations of the features described in the embodiment are necessary to solve the problem of the invention.

In addition, the invention can be appropriately modified and implemented without departing from the gist thereof. For example, although the case where the fastener 6 is a spring pin has been described in the embodiment, it is not limited thereto and the fastener 6 may be a bolt. In this case, the retention hole 510 of the magnetic ring 5 is formed as a threaded hole, and a male screw portion of the fastener 6 is screwed into the threaded hole.

The invention claimed is:

1. A magnetostrictive torque sensor configured to be attached around a rotating shaft exhibiting a magnetostrictive effect and detects torque transmitted by the rotating shaft, the magnetostrictive torque sensor comprising:

a holder being composed of a resin and comprising a cylinder portion with a hollow cavity in a center through which the rotating shaft is inserted;

a flexible substrate that comprises a detection portion on which a coil group comprising a combination of a plurality of detection coils aligned in a predetermined direction is formed by a wiring pattern, and a signal line portion on which a plurality of signal lines electrically connecting the coil group to an external device are formed by a wiring pattern; and a magnetic ring with a cylindrical shape comprising a soft magnetic material and being arranged around an outer circumference of the cylinder portion of the holder, wherein the flexible substrate is arranged in such a manner that the detection portion is curved and located between the cylinder portion of the holder and the magnetic ring, and a portion of the signal line portion is led out of the holder, wherein the holder comprises an annular wall surrounding an outer circumference of one axial end of the magnetic ring, wherein the magnetic ring comprises a retention hole that opens on an outer circumferential surface facing an inner circumferential surface of the annular wall, wherein the holder and the magnetic ring are fixed by a fastener with a shaft shape that penetrates the annular wall and is inserted into the retention hole of the magnetic ring, wherein the detection portion has a rectangular shape with a long-side direction coincident with an alignment direction of the plurality of detection coils, wherein the signal line portion comprises a protruding portion protruding from the detection portion in a direction perpendicular to the long-side direction, and a linear portion extending from the protruding portion in the long-side direction, and wherein a portion of the linear portion is led out of the holder.

2. The magnetostrictive torque sensor according to claim 1, wherein the holder comprises a recessed portion to house the portion of the linear portion, and wherein the linear portion is bent inside the recessed portion and is led out of the holder so as to extend in a direction perpendicular to a circumferential direction of the cylinder portion.

3. The magnetostrictive torque sensor according to claim 2, further comprising: a cover member comprising a raised portion fitted into the recessed portion of the holder, wherein the linear portion is sandwiched and held between an inner surface of the recessed portion and an outer circumferential surface of the raised portion.

4. The magnetostrictive torque sensor according to claim 3, wherein movement of the cover member in a direction in which the raised portion separates away from the recessed portion of the holder is restricted by the magnetic ring.

5. The magnetostrictive torque sensor according to claim 1, wherein the detection portion of the flexible substrate is adhered to the cylinder portion of the holder, and a space is formed between the detection portion and the magnetic ring.

6. The magnetostrictive torque sensor according to claim 1, wherein the fastener protrudes from an outer circumferential surface of the annular wall, and wherein engagement of the protruding portion of the fastener with an attachment target stops the holder and the magnetic ring from rotating relative to the attachment target.

* * * * *